(12) United States Patent
Steinbacher

(10) Patent No.: US 7,267,081 B2
(45) Date of Patent: Sep. 11, 2007

(54) HOUSING FOR A COLLAR-MOUNTED PET ACCESSORY AND ASSOCIATED COLLAR MOUNTING SYSTEM

(75) Inventor: Kurt J. Steinbacher, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 535 days.

(21) Appl. No.: 10/846,324

(22) Filed: May 14, 2004

(65) Prior Publication Data
US 2005/0263106 A1    Dec. 1, 2005

(51) Int. Cl.
*A62B 35/00* (2006.01)
(52) U.S. Cl. ..................... 119/858; 224/240
(58) Field of Classification Search ............... 119/795, 119/792, 858, 860; 224/163, 195, 240, 904, 224/576, 578, 182, 255, 271; 108/43
See application file for complete search history.

(56) References Cited

U.S. PATENT DOCUMENTS

| | | | |
|---|---|---|---|
| 3,477,409 A * | 11/1969 | Costanzo | ..................... 119/174 |
| 4,180,013 A | 12/1979 | Smith et al. | |
| 4,266,326 A * | 5/1981 | Hong | ..................... 24/265 WS |
| 5,601,054 A | 2/1997 | So | |
| 5,927,233 A | 7/1999 | Mainini et al. | |
| 6,047,664 A | 4/2000 | Lyerly | |
| 6,293,445 B1 * | 9/2001 | Miller | ..................... 224/240 |
| 6,351,874 B1 * | 3/2002 | Suggs | ..................... 24/265 BC |
| 6,374,778 B1 * | 4/2002 | Glussich | ..................... 119/859 |

OTHER PUBLICATIONS

"Ultralight Sonic Bark Control—Quick Guide," Radio Systems Corporation, Knoxville, TN.
"Deluxe Bark Control Collar—Owner's Manual," Radio Systems Corporation, Knoxville, TN.
Product Photos, "Deluxe Sport Dog Beeper Locator," Model DSL-400, Radio Systems Corporation, Knoxville, TN (2 pp).

* cited by examiner

*Primary Examiner*—Teri Pham Luu
*Assistant Examiner*—Kimberly S. Smith
(74) *Attorney, Agent, or Firm*—Pitts & Brittian, PC

(57) ABSTRACT

A housing (10) for a pet accessory, and an associated collar mounting system for mounting the housing (10) on a pet collar (12). The housing (10) includes a casing (14) for housing at least certain components of the pet accessory. Further, the housing (10) defines at least first and second selectively spaced channels (22, 24) for receiving the pet collar (12) and releasably securing the housing (10) on the pet collar (12). The housing (10) also includes at least one protrusion (26) disposed between the selectively spaced channels (22, 24) and which extends outwardly from the casing (14) for engagement with the pet collar (12) to inhibit movement of the housing (10) along the length of the collar (12).

31 Claims, 4 Drawing Sheets

HOUSING FOR A COLLAR-MOUNTED PET ACCESSORY AND ASSOCIATED COLLAR MOUNTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to housings for collar-mounted pet accessories such as collar-mounted bark control devices, containment fence receivers, remote trainers, pet locators, and the like. More specifically, the present invention is related to a collar-mounted housing having an associated collar mounting system which includes a brake mechanism which maintains the position of the housing at a desired location along the length of the collar.

2. Description of the Related Art

Collar-mounted pet accessories such as collar-mounted bark control devices, containment fence receivers, remote trainers, pet locators, and the like, are well known. Certain collar mounted accessories are mounted on a collar by inserting one or more electrodes, probes, or mechanical fasteners through holes in the collar and securing the accessory in place, typically by threading a nut onto the electrodes, probes or mechanical fasteners, as is the case with respect to the devices disclosed in U.S. Pat. Nos. 4,180,013 and 6,047,664. As a consequence of the electrodes, probes, and/or mechanical fasteners being received through the collar, the pet accessory is held at a desired location along the length of the collar. However, such collar mounting systems require that holes be made in the collar, and other systems, such as the one used with the device disclosed in U.S. Pat. No. 5,601,054 require specially constructed collars to accommodate the housing. Certain collar-mounted pet accessories utilize loops or openings through which the collar is threaded to secure the accessory on the collar, thereby allowing the use of a conventional collar to support the housing. For example, U.S. Pat. No. 5,927,233 discloses a pet accessory that utilizes loops through which a collar is threaded. Whereas such loop mechanisms serve to secure the pet accessory to the collar, the accessory generally is allowed to move along the length of the collar. Although this may not be problematic with respect to certain collar-mounted pet accessories, it is desirable that certain pet accessories be maintained at a fixed location along the length of the associated collar. For example, certain bark control devices utilize vibration monitors to detect barking, and it is desirable that the vibration probe(s) of the vibration monitor be directly in contact with the throat of the dog proximate the vocal cords. Therefore, it is desirable that the bark control device remain at a fixed location along the length of the collar on which it is mounted. Similarly, collar mounted receivers for containment fences typically have stimulus delivery systems which selectively deliver corrective stimuli to a dog, and it is generally desirable that the receiver be positioned proximate the lower portion of the dogs neck when the stimulus is delivered. Accordingly, it is desirable that the collar-mounted receiver be maintained at a fixed location along the length of the collar such that the desired position of the receiver relative to the dog can more consistently be maintained.

BRIEF SUMMARY OF THE INVENTION

The present invention provides a housing for a pet accessory and an associated collar mounting system for releasably securing the housing on a pet collar. The housing includes a casing for housing at least certain components of a pet accessory such as a collar-mounted bark control system, containment fence receiver, remote trainer system, pet locator, or the like. First and second loop members are carried by the casing for securing the housing to the pet collar. In this regard, the first loop member, in cooperation with the casing, defines a first channel for releasably receiving the pet collar, and the second loop member, in cooperation with the casing, defines a second channel for releasably receiving the pet collar. In various embodiments the housing includes one or more protrusions extending outwardly from the casing between the first and second loop members for engaging the pet collar to inhibit movement of the housing along the length of the collar.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
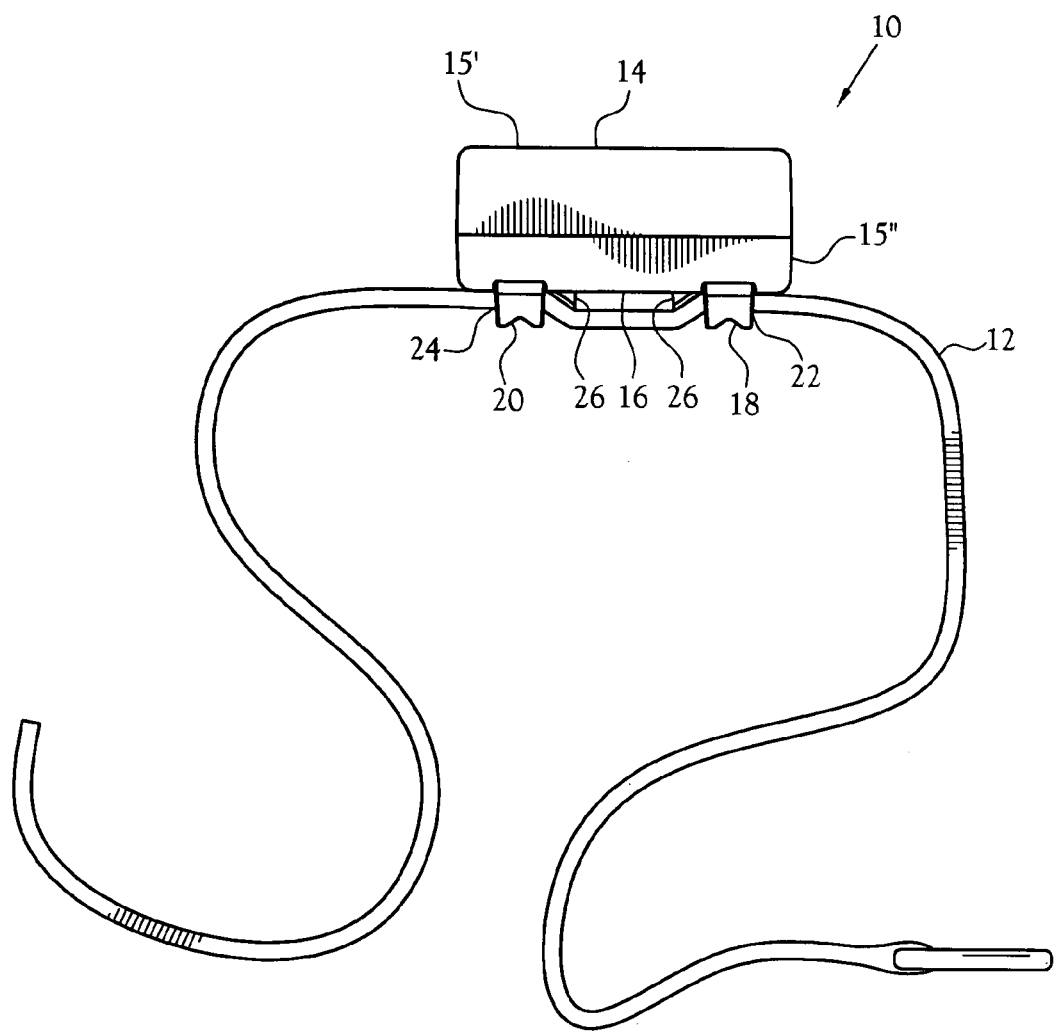
FIG. 1 is a side elevation view of a housing for a collar-mounted pet accessory of the present invention.

A housing for a collar-mounted pet accessory in accordance with the present invention is illustrated generally at 10 in the drawings. The housing 10 is designed to be mounted on a collar 12 and can be utilized to house various pet accessories such as collar-mounted bark control systems, containment fence receivers, remote trainer systems, pet locators, and the like. As will be discussed in detail below, the housing 10 incorporates a collar mounting system including a brake mechanism that restricts the movement of the housing 10, and the pet accessory therein, along the length of the collar 12, thereby maintaining the housing 10 at a desired location on the collar 12.

The housing 10 includes a casing 14 for housing the pet accessory (not shown). Whereas in the illustrated embodiment the casing 14 defines a three dimensional configuration made up of rectilinear walls, it will be understood that the casing 14 can define various configurations, and the desired configuration will typically be dictated by the requirements of the pet accessory to be mounted in the casing 14. Further, in the illustrated embodiment the casing 14 includes joined front and rear components 15' and 15", respectively. However, it will be understood that the casing 14 can be integrally formed, or can be formed of various numbers of interlocking parts depending on the requirements of the pet accessory to be mounted therein. Moreover, the casing 14 can be fabricated of various strong, durable materials, such as plastic or metal.

Figure 2:
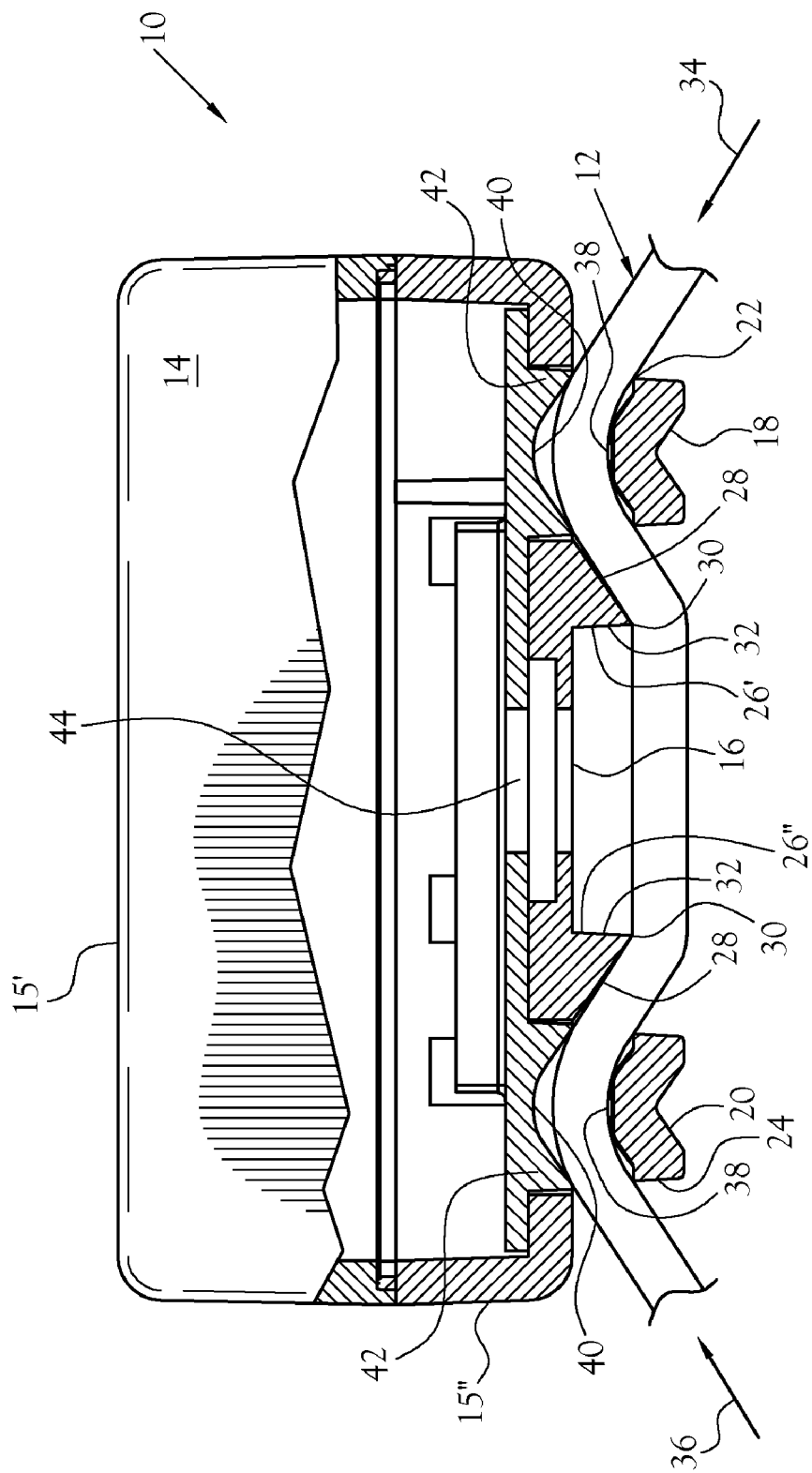
FIG. 2 is a side elevation view, partially in section, of a housing for a collar-mounted pet accessory of the present invention.

The casing 14 defines a rear wall 16 that carries a collar mounting system which is utilized to releasably secure the housing 10 to a pet collar 12. The collar mounting system includes first and second selectively spaced loop members 18 and 20, respectively that, in cooperation with the rear wall 16, define channels 22 and 24 through which a collar 12 is threaded as illustrated in FIGS. 1 and 2. In the illustrated embodiment of the housing 10 the loop members 18 and 20 are integrally formed with the rear wall 16 of the casing 14. However, it will be understood by those skilled in the art that the loop members 18 and 20 can be separately formed and secured to the rear wall 16 utilizing a suitable securing technique such as welding, adhesives, or mechanical fasteners.

Figure 3:
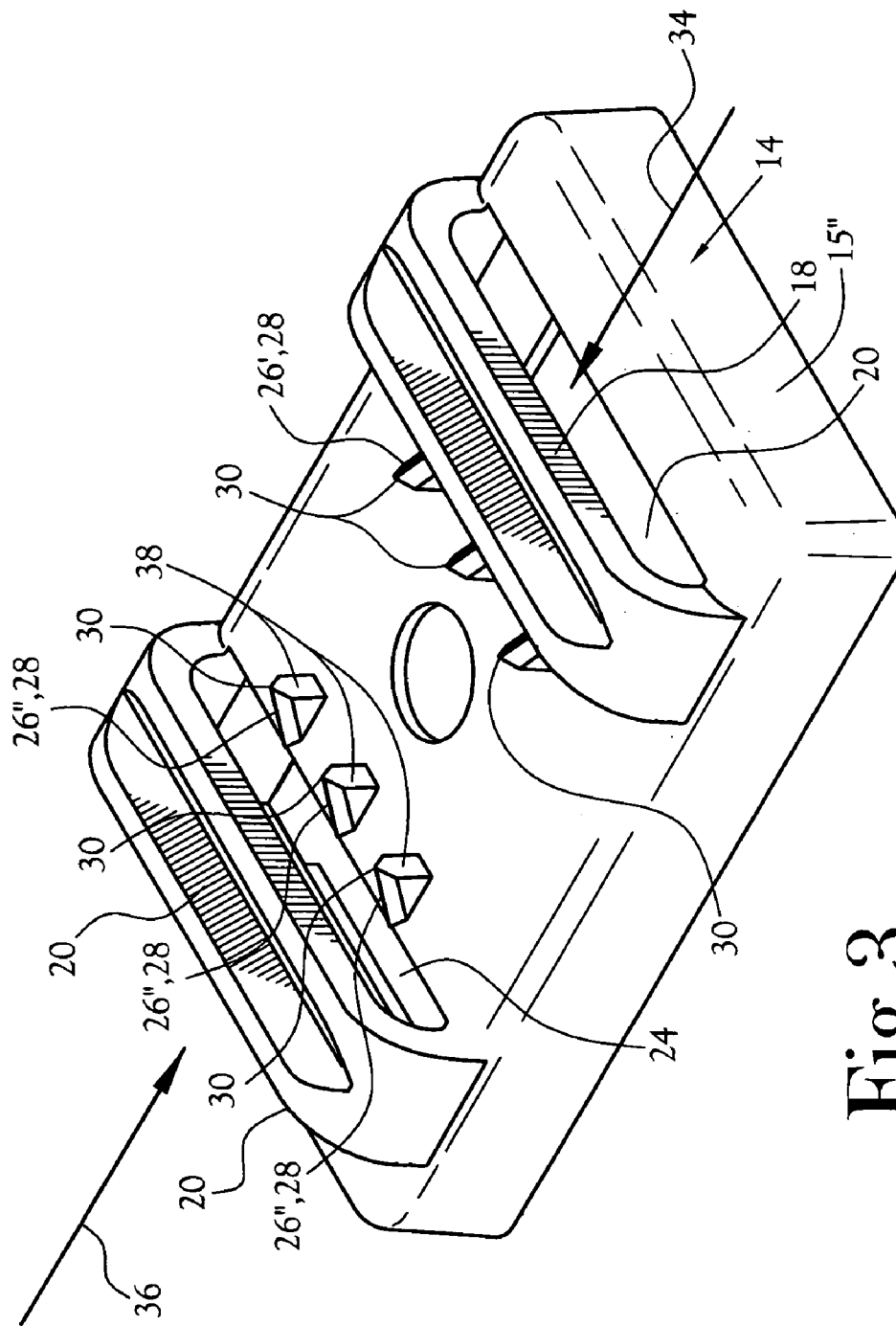
FIG. 3 is a perspective view of a portion of a housing for a collar-mounted pet accessory of the present invention.
Figure 4:
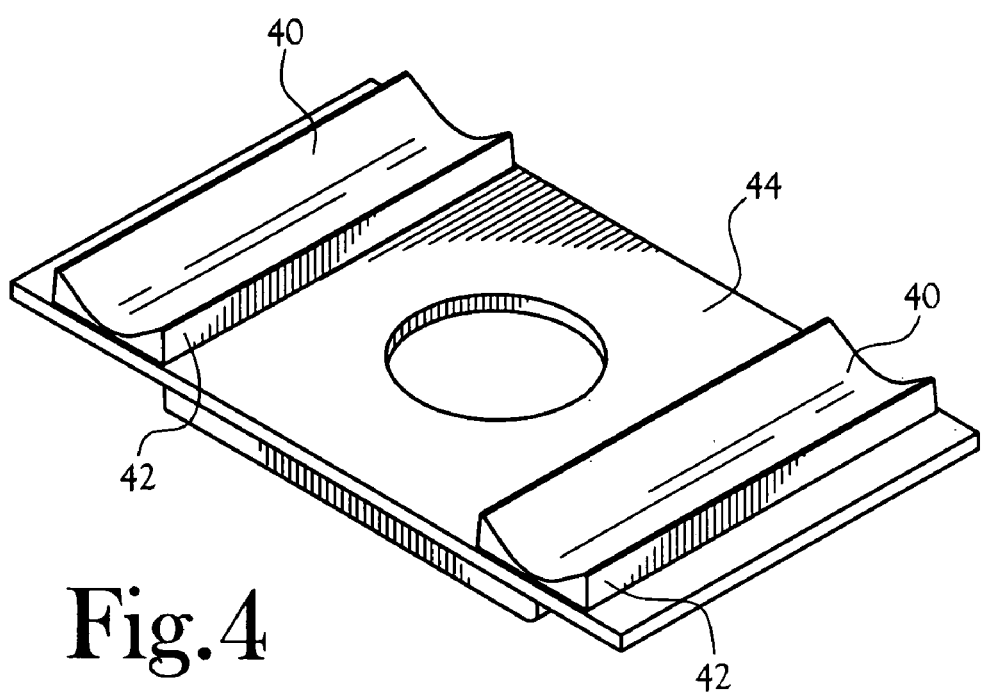
FIG. 4 is a perspective view of the channel inserts of a housing for a collar-mounted pet accessory of the present invention.

As indicated above, the collar mounting system of the present invention incorporates a brake mechanism that restricts the movement of the housing 10, and the pet accessory therein, along the length of the collar 12, and, thereby, maintains the housing 10 at a desired location on the collar 12. The brake mechanism includes at least one collar engaging protrusion 26, and in the illustrated embodiment includes a plurality of collar engaging protrusions 26' and 26", which project from the casing 14. As illustrated in FIGS. 2 and 3, in one embodiment the brake mechanism includes a row of three collar engaging protrusions 26' positioned between the loop members 18 and 20, proximate the loop member 18. In this particular embodiment, each of the protrusions 26' defines a wedge shape with a sloped side portion 28 terminating in a pointed distal end 30 and with an opposing side 32 that extends outwardly from the rear wall 16 of the casing 14 at substantially a right angle to the rear wall 16. It will be noted that each protrusion 26' is oriented such that the sloped side portion 28 faces, and slopes downwardly toward, the channel 22 so as to provide a ramp structure. Thus, it will be recognized that the sloped side portions 28 facilitate the sliding movement of a collar 12 through the channel 22 in the direction of the arrow 34, but the pointed distal ends 30 of the protrusions 26' engage the collar 12, thereby inhibiting movement of the collar 12 through the loop 18 in the opposite direction. Whereas a row of three protrusions 26' are illustrated in the drawings, it will be understood that other numbers of protrusions 26' can be used.

As is also illustrated in FIGS. 2 and 3, in one embodiment the brake mechanism includes a row of three collar engaging protrusions 26" positioned between the loop members 18 and 20, proximate the loop member 20 and selectively spaced from the protrusions 26'. As in the case of the protrusions 26', in this particular embodiment, each of the protrusions 26" defines a sloped side portion 28 terminating in a pointed distal end 30, and defines an opposing side 32 that extends outwardly from the rear wall 16 of the casing 14 at substantially a right angle to the rear wall 16. Each protrusion 26" is oriented such that the sloped side portion 28 faces, and slopes downwardly toward, the channel 24. Thus, it will be recognized that the sloped side portions 28 facilitate the sliding movement of a collar 12 through the channel 24 in the direction of the arrow 36, but the pointed distal ends 30 of the protrusions 26" engage the collar, thereby inhibiting movement of the collar 12 through the loop 20 in the opposite direction. Whereas a row of three protrusions 26" are illustrated in the drawings, it will be understood that other numbers of protrusions 26" can be used.

Accordingly, it will be recognized that the pointed distal ends 30 of the collar engaging protrusions 26' and 26" cooperatively hold the housing 10 in place on the collar 12 after the collar has been threaded through the channels 22 and 24. However, the sloped side portions 28 of the protrusions 26' and 26" facilitate the initial threading of the collar 12 through the loop members 18 and 20. The sloped side portions 28 also facilitate the repositioning of the housing 10 along the length of the collar 12 and facilitate the removal of the housing 10 from the collar 12. In this regard, after sufficient slack has been placed in the collar 12 between the two loop members 18 and 20 the pointed distal ends 30 will disengage from the collar and the sloped side portions 28 facilitate the uninterrupted movement of the collar 12 through the loop member 18 and 20. However, notwithstanding the advantageous configuration of the illustrated protrusions 26', 26", it is contemplated that the protrusions can define other configurations which protrude from the casing 14 and engage the collar 12 to inhibit movement of the collar through the loop member 18 and 20. The illustrated configuration of the protrusions 26', 26" is merely illustrative of one preferred embodiment of the protrusions 26. For example, the protrusions 26 could define pyramidal, conical, rectangular, or various other shapes.

In order to enhance both the effectiveness of the braking action provided by the protrusions 26 and the ease with which a collar 12 can be moved through the channels 22 and 24 when desired, in one embodiment of the present invention the channels 22 and 24 each define arcuate pathways which, in cooperation with the protrusions 26, serve to bend the collar 12 outwardly toward the casing 14 and then inwardly to be engaged by the pointed distal ends 30 of the protrusions 26. For example, in the particular embodiment illustrated in the figures, each of the loop members 18 and 20 defines a convex inner surface 38 and the casing 14 defines an opposing concave surface portion 40 such that the convex inner surfaces 38 and the concave surface portions 40 cooperatively define the arcuate channels 22 and 24. It will be recognized that the arcuate shape of the channels 22 and 24 in cooperation with the sloped side portions 28 of the protrusions 26 facilitate the threading of the collar 12 through the loop members 18 and 20, without the collar 12 engaging the pointed distal ends 30 when there is slack provided in the collar 12. However, when the slack is removed from the collar 12, as in the case where the collar is secured about the neck of a pet, the outward bending of the collar as it is received through the arcuate channels 22 and 24, followed by the inward bending of the collar 12 as it approaches the pointed distal ends 30 of the protrusions 26, secures the housing in a fixed position on the collar 12. Thus, the serpentine-like path of the collar 12 through the channel 22, over the protrusions 26, and through the channel 24 facilitates the secure positioning of the housing 10 on the collar 12 when the collar 12 is worn by the pet. However, when the collar 12 is removed from the pet, slack can be placed in the collar 12 between the loop member 18 and 20 to allow the housing 10 to quickly and easily be relocated on, or removed from, the collar 12.

Whereas the concave surfaces 40 that help define the channels 22 and 24 can be integrally formed in the rear wall 16 of the casing 14, it will be noted that in the illustrated embodiment of the housing 10 the rear wall 16 defines openings opposite the loop members 18 and 20. Each of these openings receives a channel insert 42 that defines one of the concave surface portion 40. In one embodiment, the two channel inserts 42 are integrally formed and connected by a bridging portion 44 therebetween. However, it will be understood that the channel inserts 42 can be formed as separate components. The channel inserts 42 can be fabricated of various strong, durable materials, such as plastic or metal. Further, the channel inserts 42 can be secured in position in the associated opening in the casing 14 by various methods. For example, various welding techniques can be used, such as ultrasonic or solvent welding. Also, various adhesives or mechanical securing mechanisms could be used.

In light of the above, it will be recognized that the housing 10 with its associated collar mounting system provides advantages over the prior art. The collar mounting system allows the housing to be quickly and easily mounted on a conventional pet collar without modifications being made to the collar and to be adjustably repositioned as desired with minimal effort. At the same time, the mounting system inhibits movement of the housing 10 along the length of the collar 12 while the collar 12 and housing 10 are secured to the neck of the pet. Accordingly, the housing 10 can be advantageously used to secure various pet accessories to a pet such as a collar-mounted bark control system, a containment fence receiver, a remote trainer systems, or pet locator.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

I claim:

1. A housing for a pet accessory, said housing being releasably mountable on a pet collar, said housing comprising a casing for housing at least certain components of the pet accessory, said housing defining at least first and second selectively spaced channels for receiving the pet collar and releasably securing said housing on the pet collar, and at least one protrusion disposed between said selectively spaced channels and protruding outwardly from said casing for engagement with the pet collar to inhibit movement of said housing along the length of the collar.

2. The housing of claim 1 wherein said protrusion defines a pointed distal end for engaging the pet collar.

3. The housing of claim 1 wherein said housing is provided with a plurality of said protrusions disposed between said first and second selectively spaced channels.

4. The housing of claim 1 wherein said housing defines at least first and second protrusions disposed between said first and second selectively spaced channels, said first protrusion defining a sloped side portion sloping downwardly toward said first selectively spaced channel and said second protrusion defining a sloped side portion sloping downwardly toward said second selectively spaced channel.

5. The housing of claim 4 wherein each said first and second protrusion defines a pointed distal end for engaging the pet collar.

6. The housing of claim 5 wherein said housing includes a plurality of said first protrusions and a plurality of said second protrusions.

7. The housing of claim 2 wherein said housing is provided with a plurality of said protrusions disposed between said first and second selectively spaced channels.

8. The housing of claim 1 wherein said first selectively spaced channel is defined by a concave surface and an opposing convex surface, and wherein said second selectively spaced channel is defined by a concave surface and an opposing convex surface.

9. The housing of claim 1 wherein said housing includes first and second loop members, said first loop member, in cooperation with said casing, defining said first selectively spaced channel, and said second loop member, in cooperation with said casing, defining said second selectively spaced channel.

10. The housing of claim 9 wherein at least a portion of said first selectively spaced channel is defined by a first concave surface provided in said casing and an opposing convex surface defined by said first loop member, and wherein at least a portion of said second selectively spaced channel is defined by a second concave surface provided in said casing and an opposing convex surface defined by said second loop member.

11. The housing of claim 9 wherein said housing defines at least first and second protrusions disposed between said selectively spaced channels, said first protrusion defining a sloped side portion disposed toward said first selectively spaced channel and said second protrusion defining a sloped side portion disposed toward said second selectively spaced channel.

12. The housing of claim 11 wherein each said first and second protrusion defines a pointed distal end for engaging the pet collar.

13. The housing of claim 10 wherein said casing includes a first channel insert defining said first concave surface and a second channel insert defining said second concave surface.

14. A housing for a pet accessory, said housing being releasably mountable on a pet collar, said housing comprising:
    a casing for housing at least certain components of the pet accessory;
    first and second loop members carried by said casing, said first and second loop members being selectively spaced, said first loop member, in cooperation with said casing, defining a first channel for releasably receiving the pet collar, said second loop member, in cooperation with said casing, defining a second channel for releasably receiving the pet collar; and
    at least one protrusion carried by, and protruding outwardly from, said casing, said protrusion being disposed between said first and second loop members for engagement with the pet collar to inhibit movement of said housing along the length of the collar.

15. The housing of claim 14 wherein said protrusion defines a pointed distal end for engaging the pet collar.

16. The housing of claim 14 wherein said housing is provided with a plurality of said protrusions disposed between said first and second channels.

17. The housing of claim 14 wherein said housing defines at least first and second protrusions disposed between said first and second channels, said first protrusion defining a sloped side portion sloping downwardly toward said first channel and said second protrusion defining a sloped side portion sloping downwardly toward said second channel.

18. The housing of claim 17 wherein each said first and second protrusion defines a pointed distal end for engaging the pet collar.

19. The housing of claim 14 wherein at least a portion of said first channel is defined by a first concave surface provided in said casing and an opposing convex surface defined by said first loop member, and wherein at least a portion of said second channel is defined by a second concave surface provided in said casing and an opposing convex surface defined by said second loop member.

20. The housing of claim 19 wherein said housing defines at least first and second protrusions disposed between said first and second channels, said first protrusion defining a sloped side portion sloping downwardly toward said concave surface defining said first channel and said second protrusion defining a sloped side portion sloping downwardly toward said concave surface defining said second channel.

21. The housing of claim 20 wherein said casing includes a first channel insert defining said concave surface defining said first channel, and includes a second channel insert defining said concave surface defining said second channel.

22. The housing of claim 21 wherein said first and second channel inserts are joined by a bridging portion.

23. The housing of claim 22 wherein said first and second channel inserts are integrally formed.

24. A housing for a pet accessory, said housing being releasably mountable on a pet collar, said housing comprising:
a casing for housing at least certain components of the pet accessory;
first and second loop members carried by said casing, said first and second loop members being selectively spaced, said first loop member, in cooperation with said casing, defining a first arcuate channel for releasably receiving the pet collar, said second loop member, in cooperation with said casing, defining a second arcuate channel for releasably receiving the pet collar; and
at least one first protrusion carried by, and protruding outwardly from, said casing, said protrusion being disposed between said first and second loop members proximate said first loop member for engagement with the pet collar to inhibit movement of said housing along the length of the collar, said first protrusion defining a sloped side portion sloping downwardly toward said first arcuate channel; and
at least one second protrusion carried by, and protruding outwardly from, said casing, said second protrusion being disposed between said first and second loop members proximate said second loop member for engagement with the pet collar to inhibit movement of said housing along the length of the collar, said second protrusion defining a sloped side portion sloping downwardly toward said second arcuate channel.

25. The housing of claim 24 wherein said casing defines a first concave surface portion defining at least a portion of said first arcuate channel, and wherein said casing defines a second concave surface portion defining at least a portion of said second arcuate channel.

26. The housing of claim 25 wherein said casing includes a first channel insert defining said first concave surface, and wherein said casing includes a second channel insert defining said second concave surface.

27. A collar mounting system for the housing of a pet accessory, said housing being releasably mountable on a pet collar, said housing including a casing for housing at least certain components of the pet accessory, said collar mounting system comprising:
first and second loop members carried by said casing, said first and second loop members being selectively spaced, said first loop member, in cooperation with said casing, defining a first channel for releasably receiving the pet collar, said second loop member, in cooperation with said casing, defining a second channel for releasably receiving the pet collar; and
at least one protrusion carried by, and protruding outwardly from, said casing, said protrusion being disposed between said first and second loop members for engagement with the pet collar to inhibit movement of said housing along the length of the collar.

28. The collar mounting system of claim 27 wherein said protrusion defines a pointed distal end for engaging the pet collar.

29. The collar mounting system of claim 27 wherein said housing is provided with a plurality of said protrusions disposed between said first and second channels.

30. The collar mounting system of claim 27 wherein said housing defines at least first and second protrusions disposed between said first and second channels, said first protrusion defining a sloped side portion sloping downwardly toward said first channel and said second protrusion defining a sloped side portion sloping downwardly toward said second channel.

31. The collar mounting system of claim 30 wherein each said first and second protrusion defines a pointed distal end for engaging the pet collar.

* * * * *